US007330010B2

(12) United States Patent
Schroderus et al.

(10) Patent No.: US 7,330,010 B2
(45) Date of Patent: Feb. 12, 2008

(54) METHOD FOR OPERATING A ROTATING ELECTRICAL MACHINE AND APPARATUS FOR CARRYING OUT THE METHOD

(75) Inventors: Petri Schroderus, Espoo (FI); Petteri Ämmälä, Baden-Dättwil (CH); Halina Burzanowska, Untersiggenthal (CH)

(73) Assignee: ABB Schweiz AG, Baden (CH)

( * ) Notice: Subject to any disclaimer, the term of this patent is extended or adjusted under 35 U.S.C. 154(b) by 2 days.

(21) Appl. No.: 11/350,045

(22) Filed: Feb. 9, 2006

(65) Prior Publication Data
US 2006/0279247 A1 Dec. 14, 2006

(30) Foreign Application Priority Data
Jun. 8, 2005 (EP) .................................. 05405373

(51) Int. Cl.
*H02P 1/46* (2006.01)
(52) U.S. Cl. ...................... 318/716; 318/801; 318/727; 318/255
(58) Field of Classification Search ................ 318/716, 318/801, 727, 255; 363/37, 70, 44, 84
See application file for complete search history.

(56) References Cited

U.S. PATENT DOCUMENTS

| | | | |
|---|---|---|---|
| 4,349,772 A | 9/1982 | Weiss | |
| 4,434,389 A | 2/1984 | Langley et al. | |
| 6,118,246 A | 9/2000 | Eyerly | |
| 2005/0105306 A1* | 5/2005 | Deng et al. | ............... 363/37 |

FOREIGN PATENT DOCUMENTS

| | | |
|---|---|---|
| DE | 198 35 576 A1 | 11/1999 |
| EP | 1 521 356 A2 | 4/2005 |

OTHER PUBLICATIONS

International Search/Examination Report, Mar. 11, 2005.

\* cited by examiner

*Primary Examiner*—Karen Masih
(74) *Attorney, Agent, or Firm*—Buchanan Ingersoll & Rooney PC

(57) ABSTRACT

A method is specified for operating a rotating electrical machine (1), which machine (1) has at least two sets of stator windings (A, B), in each case one associated converter unit (2) being provided for each set of stator windings (A, B) and each set of stator windings (A, B) comprising n phase windings, where $n \geq 3$, in which method the respective set of stator windings (A, B) is fed by the associated converter unit (2). In order to make it possible to regulate or influence electrical variables of the individual sets of stator windings of the rotating electrical machine in redundant fashion and independently, the currents ($i_{A1}$, $i_{A2}$, $i_{A3}$; $i_{B1}$, $i_{B2}$, $i_{B3}$) of at least n−1 phase windings of each set of stator windings (A, B) are measured, and in each case one associated regulating device (3) is provided for each converter unit (2) and each converter unit (2) is driven by means of a drive signal (S) of the associated regulating device (3) independently of regulating devices (3) of the respective other converter units (2). In addition, the drive signal (S) is formed in the respective regulating device (3) from the measured currents ($i_{A1}$, $i_{A2}$, $i_{A3}$; $i_{B1}$, $i_{B2}$, $i_{B3}$) of each set of stator windings (A, B). Furthermore, an apparatus is specified for carrying out the method.

14 Claims, 4 Drawing Sheets

METHOD FOR OPERATING A ROTATING ELECTRICAL MACHINE AND APPARATUS FOR CARRYING OUT THE METHOD

TECHNICAL FIELD

The invention relates to the field of operating methods for rotating electrical machines. It is based on a method for operating a rotating electrical machine and an apparatus for carrying out the method in accordance with the precharacterizing clause of the independent claims.

PRIOR ART

Apparatuses for methods for operating rotating electrical machines are increasingly required and used today. A suitable apparatus has been disclosed, for example, in EP 1 521 356 A2. This document specifies a rotating electrical machine which has two sets of stator windings. Furthermore, in each case one associated converter unit is provided for each set of stator windings for the purpose of feeding it. In each case one associated regulating device is provided for each of the converter units for the purpose of driving the associated converter unit by means of a drive signal. In addition, measuring means are provided for measuring the currents of a set of stator windings, which measured currents are supplied to the associated regulating device, this regulating device acting as the so-called "master", i.e. inputs the measured currents of the "master" regulating device to the other regulating device, which acts as the so-called "follower". The measured currents are input via a dataline. In response to the currents input by the "master" regulating device, the "follower" regulating device then emits a corresponding drive signal to its associated converter device, i.e. the drive signal of the "follower" regulating device is dependent on the input of the "master" regulating device, which input represents a reference.

One problem associated with a method for operating a rotating electrical machine and with the associated apparatus for carrying out the method in EP 1 521 356 A2 is the fact that one regulating device, specifically the "follower" regulating device, is dependent on the other regulating device, specifically the "master" regulating device. Real independence and redundancy of the regulating devices with their associated converter units and thus separate independent regulation or influencing of electrical variables of the respective sets of stator windings, in particular the currents of each set of stator windings, is thus not provided.

SUMMARY OF THE INVENTION

One object of the invention is therefore to specify a method for operating a rotating electrical machine which makes possible redundant and independent regulation or influencing of electrical variables of the individual sets of stator windings of the rotating electrical machine. In addition, an apparatus needs to be specified which can be realized in a very simple and robust manner and with little complexity in terms of circuitry and which can be used to carry out the operating method in a particularly simple manner. These objects are achieved by the features of claims 1 and 6, respectively. Advantageous developments of the invention are specified in the dependent claims.

The rotating electrical machine has at least two sets of stator windings and each set of stator windings comprises n phase windings, where $n \geq 3$, in each case one associated converter unit being provided for each set of stator windings for feeding the set of stator windings. In the operating method according to the invention, the respective set of stator windings is now fed by the associated converter unit. According to the invention, the currents of at least n−1 phase windings of each set of stator windings are now measured. Furthermore, in each case one associated regulating device is provided for each converter unit, each converter unit being driven by means of a drive signal of the associated regulating device independently of regulating devices of the respective other converter units. The drive signal is formed in the respective regulating device from the measured currents of each set of stator windings. Owing to the abovementioned measures of the method according to the invention, the electrical variables of the respective sets of stator windings, in particular the currents of each set of stator windings, can advantageously be regulated or influenced separately and independently such that redundant regulation or influencing is made possible. The availability and maintenance friendliness of the entire system can thus advantageously be increased.

The apparatus according to the invention for carrying out the method for operating a rotating electrical machine has in each case one associated converter unit provided for each set of stator windings for feed purposes. According to the invention, measuring means are now provided for measuring the currents of at least n−1 phase windings of each set of stator windings. Furthermore, in each case one associated regulating device is provided for each converter unit for the purpose of driving the associated converter unit by means of a drive signal independently of regulating devices of the respective other converter units. Each regulating device is supplied the measured currents of each set of stator windings for the purpose of forming the drive signal. The apparatus according to the invention can thus be realized in a very simple and robust manner and with little complexity in terms of circuitry, it being possible for the method according to the invention to be carried out in addition in a particularly simple manner using the apparatus according to the invention. Owing to the respective regulating device for driving the associated converter unit independently of regulating devices of the respective other converter units, the apparatus according to the invention is of redundant design, as a result of which high availability and a high degree of maintenance friendliness of the entire system can be achieved.

These and other objects, advantages and features of the present invention will be disclosed in the detailed description below of preferred embodiments of the invention in conjunction with the drawing.

Figure 1:
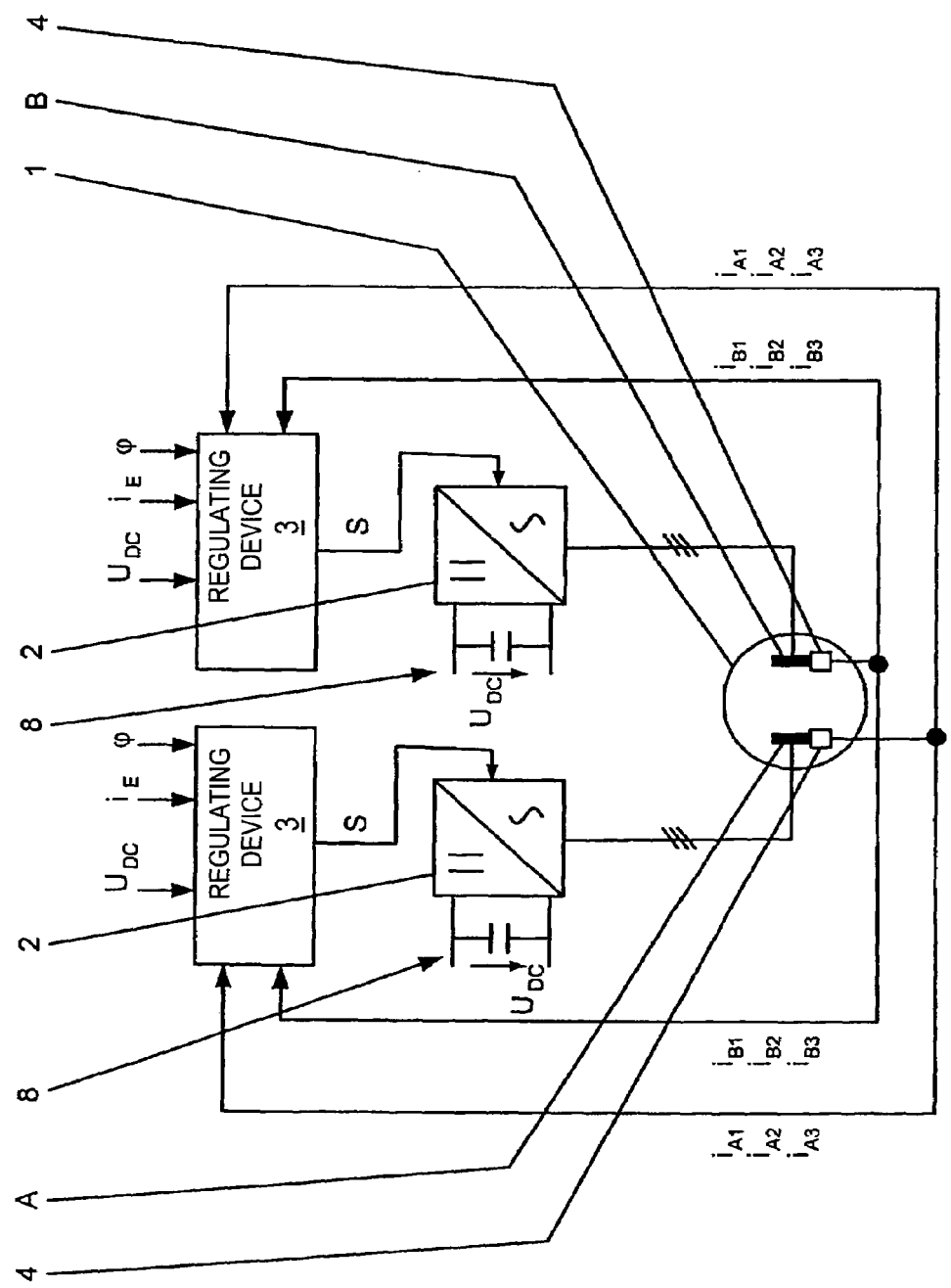
FIG. 1 shows a first embodiment of an apparatus according to the invention for carrying out the method according to the invention for operating a rotating electrical machine, in particular for a rotating electrical machine in the form of a synchronous machine.

The references used in the drawing and their significance are listed by way of summary in the list of references. In principle, identical parts are provided with the same references in the figures. The embodiments described represent, by way of example, the subject matter of the invention and have no restrictive effect.

Aproaches to Implementing the Invention

Figure 3:
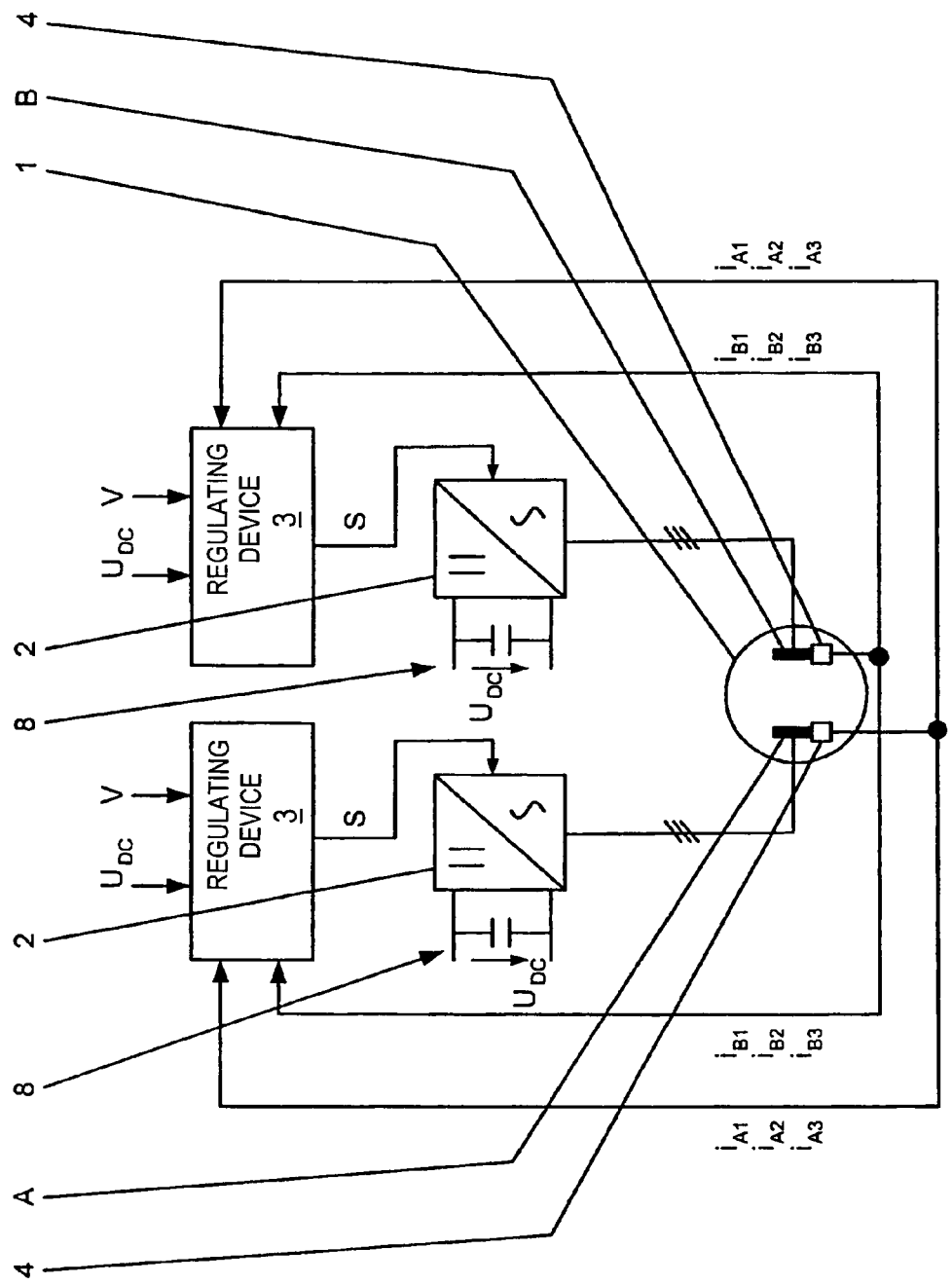
FIG. 3 shows a second embodiment of an apparatus according to the invention for carrying out the method according to the invention for operating a rotating electrical machine, in particular for a rotating electrical machine in the form of an asynchronous machine.

FIG. 1 shows a first embodiment of an apparatus according to the invention for carrying out the method according to the invention for operating a rotating electrical machine 1, in particular for a rotating electrical machine 1 in the form of a synchronous machine. Furthermore, FIG. 3 shows a second embodiment of an apparatus according to the invention for carrying out the method according to the invention for operating a rotating electrical machine 1, in particular for a rotating electrical machine 1 in the form of an asynchronous machine. The machine 1 has at least two sets of stator windings A, B, i.e. more than two sets of stator windings A, B are also conceivable. Each set of stator windings A, B typically comprises n phase windings, where $n \geq 3$. In the embodiments shown in FIGS. 1 and 3, two sets of stator windings A, B are shown, each having n=3 phase windings. As shown in FIG. 1 and FIG. 3, in each case one associated converter unit 2 is provided for each set of stator windings A, B. The respective set of stator windings A, B is fed by the associated converter unit 2.

In the method according to the invention, the currents $i_{A1}$, $i_{A2}$, $i_{A3}$; $i_{B1}$, $i_{B2}$, $i_{B3}$ of at least n−1 phase windings of each set of stator windings A, B are now measured. In FIG. 1 and FIG. 3, the currents $i_{A1}$, $i_{A2}$, $i_{A3}$; $i_{B1}$, $i_{B2}$, $i_{B3}$ of n=3 phase windings of each set of stator windings A, B are measured, but generally it is sufficient to measure only n−1 currents $i_{A1}$, $i_{A2}$, $i_{A3}$; $i_{B1}$, $i_{B2}$, $i_{B3}$, which advantageously results in a simplification. In addition, as shown in FIG. 1 and FIG. 3, in each case one associated regulating device 3 is provided for each converter unit 2 and each converter unit 2 is driven by means of a drive signal S of the associated regulating device 3 independently of regulating devices 3 of the respective other converter units 2. In addition, the drive signal S is formed in the respective regulating device 3 from the measured currents $i_{A1}$, $i_{A2}$, $i_{A3}$; $i_{B1}$, $i_{B2}$, $i_{B3}$ of each set of stator windings A, B. As shown in FIG. 1 and FIG. 3, each regulating device 3 is supplied the n=3 measured currents $i_{A1}$, $i_{A2}$, $i_{A3}$; $i_{B1}$, $i_{B2}$, $i_{B3}$ of each set of stator windings A, B for the purpose of forming the drive signal S. In general, however, each regulating device 3 is supplied the at least n−1 measured currents $i_{A1}$, $i_{A2}$, $i_{A3}$; $i_{B1}$, $i_{B2}$, $i_{B3}$ of each set of stator windings A, B for the purpose of forming the drive signal S.

Owing to the abovementioned measures of the method according to the invention, the electrical variables of the respective sets of stator windings A, B, in particular the currents $i_{A1}$, $i_{A2}$, $i_{A3}$; $i_{B1}$, $i_{B2}$, $i_{B3}$ of each set of stator windings A, B and/or the phase output voltages of the converter unit 2, can advantageously be regulated or influenced separately and independently. Redundant regulation or influencing of these currents $i_{A1}$, $i_{A2}$, $i_{A3}$; $i_{B1}$, $i_{B2}$, $i_{B3}$ or the phase output voltages of the converter unit 2 is thus made possible. As a result, the availability and maintenance friendliness of the entire system can advantageously be increased. In addition, the method according to the invention and the apparatus according to the invention make possible a so-called four-quadrant operation of the respective converter unit 2.

Furthermore, the apparatus according to the invention can be realized in a very simple and robust manner and with little complexity in terms of circuitry, it being possible for the method according to the invention to be carried out in addition in a particularly simple manner using the apparatus according to the invention. Owing to the respective regulating device 3 for driving the associated converter unit 2 independently of regulating devices 3 of the respective other converter units 2, the apparatus according to the invention is of redundant design, as a result of which high availability and a high degree of maintenance friendliness of the entire system can be achieved. In addition, the method according to the invention with the apparatus according to the invention makes possible a so-called four-quadrant operation of the respective converter unit 2.

Figure 2:
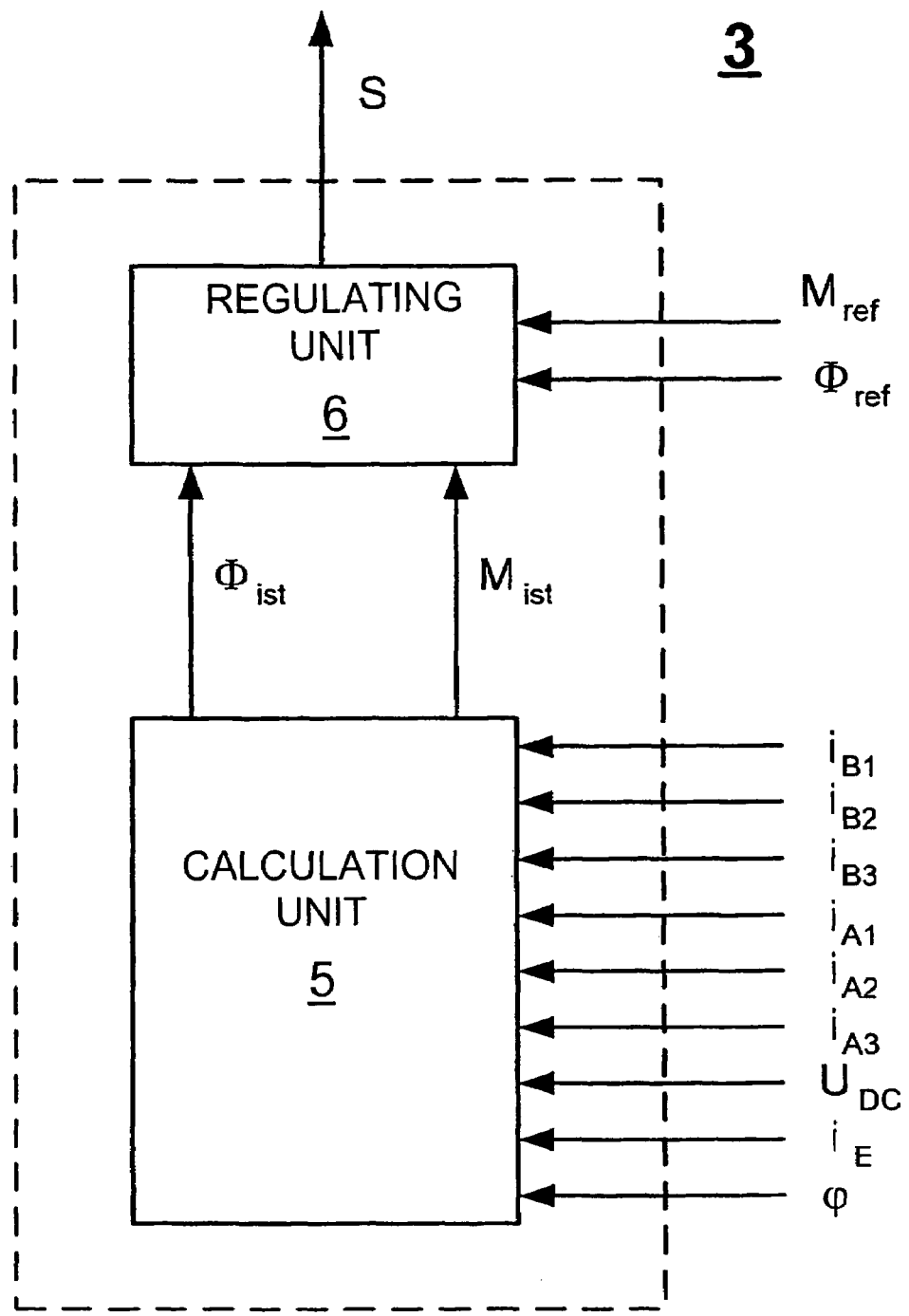
FIG. 2 shows an embodiment of a regulating device of the apparatus shown in FIG. 1.

As shown in FIG. 1 and FIG. 2, a capacitive energy store 8 is connected to the respective converter unit 2. This advantageously has the result that each converter unit 2 can be fed, for example, from a separate DC voltage system via the associated capacitive energy store 8, which increases redundancy. Alternatively, each converter unit 2 can also be fed in each case from a separate AC voltage system via the associated capacitive energy store 8 and a rectifier connected to the respective capacitive energy store 8, which likewise increases redundancy. In addition, in the event of a fault in a power supply system, for example, a converter unit 2 can feed the associated capacitive energy store 8 with electrical energy from the rotating electrical machine 1 and thus at least partially compensate for the fault on the power supply system connected to the capacitive energy store 8, while the other converter unit 2, which is fed from a separate power supply system via its associated capacitive energy store 8, feeds the rotating electrical machine 1 and thus continues to drive. It is of course also conceivable for the individual capacitive energy stores 8 to be connected to one another or for the capacitive energy store 8 to be in the form of a single, common capacitive energy store 8 to which the converter units 2 are then connected. In general, the abovementioned redundant design of the apparatus according to the invention and also the method according to the invention make it possible for a converter unit 2, for example, to be disconnected for maintenance purposes and to be reconnected after maintenance work while the other converter unit 2 continues to be operated and continues to feed the rotating electrical machine 1.

In the case of a rotating electrical machine 1 in the form of a synchronous machine, in general the present torque value $M_{act}$ and the present stator flux value $\Phi_{act}$ are formed in the respective regulating device 3 from the measured currents $i_{A1}$, $i_{A2}$, $i_{A3}$; $i_{B1}$, $i_{B2}$, $i_{B3}$ of each set of stator windings A, B, from the DC voltage $U_{DC}$ of the capacitive energy store 8 connected to the respective converter unit 2 and from the rotor position $\phi$. Such a synchronous machine, which does not require a field winding and thus also does not require a field current $i_F$, is usually a permanent magnet machine. If, on the other hand, a field winding is provided in the synchronous machine, this means for the method according to the invention that the present torque value $M_{act}$ and the present stator flux value $\Phi_{act}$ are formed, in addition to the abovementioned physical variables, from the field current $i_F$ of the field winding of the synchronous machine. In this regard, FIG. 2 shows an embodiment of the regulating device 3 of the apparatus shown in FIG. 1 for a synchronous machine having a field winding. In this figure (FIG. 2), each regulating device 3 has a calculation unit 5 for forming the present torque value $M_{act}$ and the present stator flux value $\Phi_{act}$ from the measured currents $i_{A1}$, $i_{A2}$, $i_{A3}$; $i_{B1}$, $i_{B2}$, $i_{B3}$ of each set of stator windings A, B, from the DC voltage $U_{DC}$ of the capacitive energy store 8, from the rotor position $\phi$ and from the field current $i_F$. As shown in FIG. 2, the abovementioned variables are supplied to the calculation unit 5. Mention will be made of the fact that the rotor position $\phi$ can be measured or is a calculated variable. The field current $i_F$ and the DC voltage $U_{DC}$ of the capacitive energy store 8 are in each case measured variables. As has already been mentioned, it is advantageously merely necessary to in general measure n−1 currents $i_{A1}, i_{A2}, i_{A3}; i_{B1}, i_{B2}, i_{B3}$ of each set of stator windings A, B. The respective unmeasured current $i_{A1}, i_{A2}, i_{A3}; i_{B1}, i_{B2}, i_{B3}$ of each set of stator windings A, B can advantageously be calculated from the measured currents $i_{A1}, i_{A2}, i_{A3}; i_{B1}, i_{B2}, i_{B3}$ in the calculation unit 5. One current transformer which is normally required for measuring currents but is expensive, space-consuming and also susceptible to faults can thus be dispensed with for each set of stator windings A, B.

In accordance with the method, the drive signal S is produced by adjusting the present torque value $M_{act}$ to a predeterminable reference torque value $M_{ref}$ and by adjusting the present stator flux value $\Phi_{act}$ to a predeterminable reference stator flux value $\Phi_{ref}$. Mention will be made of the fact that it is possible for the drive signal S to be produced by the abovementioned adjustment by means of a pulse width modulation method, by means of a direct torque control method (DTC) or by means of a method using optimized pulse patterns. As shown in FIG. 2, each regulating device 3 has, for this purpose, a regulating unit 6 for adjusting the present torque value $M_{act}$ to the predeterminable reference torque value $M_{ref}$ and for adjusting the present stator flux value $\Phi_{act}$ to the predeterminable reference stator flux value $\Phi_{ref}$, the drive signal S produced by the adjustment being present at the output of the regulating unit 6. In accordance with the drive signal S produced, each converter unit 2 thus follows its associated reference torque value $M_{ref}$ and reference stator flux value $\Phi_{ref}$ and thus advantageously only follows the inputs of its respectively associated regulating device 3.

Figure 4:
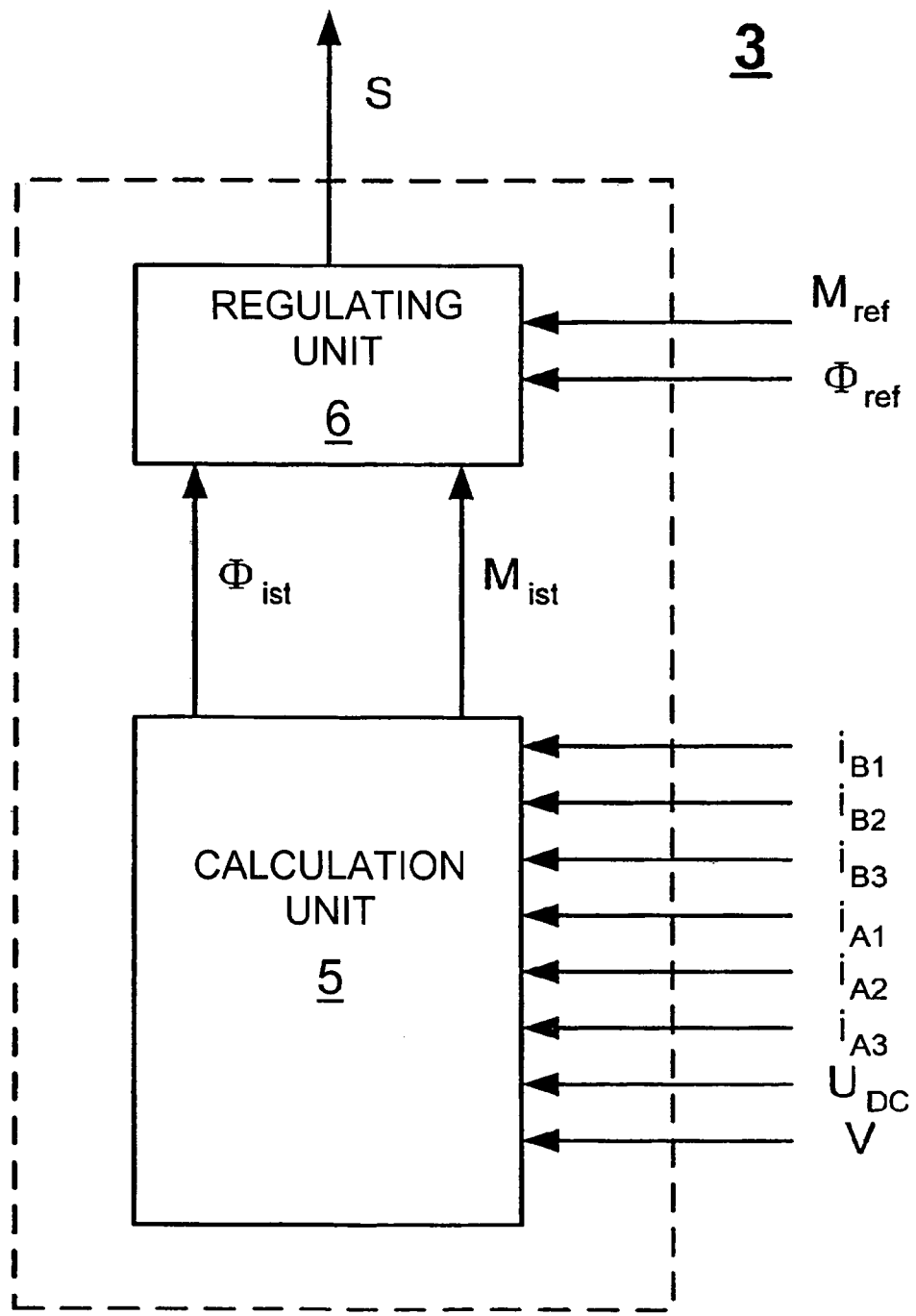
FIG. 4 shows an embodiment of a regulating device of the apparatus shown in FIG. 3.

In the case of a rotating electrical machine 1 in the form of an asynchronous machine, the present torque value $M_{act}$ and the present stator flux value $\Phi_{act}$ are formed in the respective regulating device 3 from the measured currents $i_{A1}, i_{A2}, i_{A3}; i_{B1}, i_{B2}, i_{B3}$ of each set of stator windings A, B, from the DC voltage $U_{DC}$ of the capacitive energy store 8 connected to the respective converter unit 2 and from the rotor speed V. In this regard, FIG. 4 shows an embodiment of the regulating device 3 of the apparatus shown in FIG. 3. In this figure (FIG. 4), each regulating device 3 has a calculation unit 5 for forming the present torque value $M_{act}$ and the present stator flux value $\Phi_{act}$ from the measured currents $i_{A1}, i_{A2}, i_{A3}; i_{B1}, i_{B2}, i_{B3}$ of each set of stator windings A, B, from the DC voltage $U_{DC}$ of the capacitive energy store 8 and from the rotor speed V. As shown in FIG. 4, the abovementioned variables are supplied to the calculation unit 5. Mention will be made of the fact that the rotor speed V can be measured and is thus a measured variable. The DC voltage $U_{DC}$ of the capacitive energy store 8 is likewise a measured variable. As has already been mentioned for the synchronous machine, it is advantageously merely necessary to in general measure n−1 currents $i_{A1}, i_{A2}, i_{A3}; i_{B1}, i_{B2}, i_{B3}$ of each set of stator windings A, B. The respective unmeasured current $i_{A1}, i_{A2}, i_{A3}; i_{B1}, i_{B2}, i_{B3}$ of each set of stator windings A, B can advantageously be calculated from the measured currents $i_{A1}, i_{A2}, i_{A3}; i_{B1}, i_{B2}, i_{B3}$ in the calculation unit 5. One current transformer which is normally required for measuring currents but is expensive, space-consuming and also susceptible to faults can thus be dispensed with for each set of stator windings A, B.

With reference to the method according to the invention, the drive signal S is produced by adjusting the present torque value $M_{act}$ to a predeterminable reference torque value $M_{ref}$ and by adjusting the present stator flux value $\Phi_{act}$ to a predeterminable reference stator flux value $\Phi_{ref}$ as also mentioned above for the synchronous machine. Mention will be made of the fact that it is possible for the drive signal S to be produced by the abovementioned adjustment by means of a pulse width modulation method, by means of a direct torque control method (DTC) or by means of a method using optimized pulse patterns. As shown in FIG. 4, each regulating device 3 has, for this purpose, a regulating unit 6 for adjusting the present torque value $M_{act}$ to the predeterminable reference torque value $M_{ref}$ and for adjusting the present stator flux value $\Phi_{act}$ to the predeterminable reference stator flux value $\Phi_{ref}$, the drive signal S produced being present at the output of the regulating unit 6 owing to the adjustment. In accordance with the drive signal S produced, each converter unit 2 thus follows its associated reference torque value $M_{ref}$ and reference stator flux value $\Phi_{ref}$ and thus advantageously only follows the inputs of its respectively associated regulating device 3 in the case of a rotating electrical machine 1 in the form of an asynchronous machine as well.

LIST OF REFERENCES

1 Rotating electrical machine
2 Converter unit
3 Regulating device
4 Measuring means
5 Calculation unit
6 Regulating unit
8 Capacitive energy store
A, B Sets of stator windings of the rotating electrical machine

The invention claimed is:

1. A method for operating a rotating electrical machine, which machine has at least two sets of stator windings (A, B) and each set of stator windings (A, B) comprises n phase windings, where n≧3, in each case one associated converter unit being provided for each set of stator windings (A, B), in which the respective set of stator windings, (A, B) is fed by the associated converter unit, wherein the currents ($i_{A1}$, $i_{A2}$, $i_{A3}$, $i_{B1}$, $i_{B2}$, $i_{B3}$) of at least n−1 phase windings of each set of stator windings (A, B) are measured, wherein in each case one associated regulating device is provided for each converter unit and each converter unit is driven by means of a drive signal of the associated regulating device independently of regulating devices of the respective other converter units, and wherein the drive signal (S) is formed in the respective regulating device from the measured currents ($i_{A1}$, $i_{A2}$, $i_{A3}$, $i_{B1}$, $i_{B2}$, $i_{B3}$) of each set of stator windings (A, B).

2. The method as claimed in claim 1, wherein, in the case of a rotating electrical machine in the form of a synchronous machine, the present torque value ($M_{act}$) and the present stator flux value ($\Phi_{act}$) are formed in the respective regulating device from the measured currents ($i_{A1},i_{A2},i_{A3},i_{B1},i_{B2}$, $i_{B3}$) of each set of stator windings (A, B), from the DC voltage ($U_{DC}$) of a capacitive energy store connected to the respective converter unit and from the rotor position.

3. The method as claimed in claim 2, wherein the present torque value ($M_{act}$) and the present stator flux value ($\Phi_{act}$) are formed, in addition, from the field current ($i_F$).

4. The method as claimed in claim 1, wherein, in the case of a rotating electrical machine in the form of an asynchronous machine, the present torque value ($M_{act}$) and the present stator flux value ($\Phi_{act}$) are formed in the respective regulating device from the measured currents ($i_{A1}, i_{A2}, i_{A3}, i_{B1}, i_{B2}, i_{B3}$) of each set of stator windings (A, B), from the DC voltage ($U_{DC}$) of a capacitive energy store (8) connected to the respective converter unit and from the rotor speed (V).

5. The method as claimed in claim 2, wherein the drive signal (S) is produced by adjusting the present torque value ($M_{act}$) to a predeterminable reference torque value ($M_{ref}$) and by adjusting the present stator flux value ($\Phi_{act}$) to a predeterminable reference stator flux value ($\Phi_{ref}$).

6. The method as claimed in claim 3, wherein the drive signal is produced by adjusting the present torque value to a predeterminable reference torque value and by adjusting the present stator flux value to a predeterminable reference stator flux value.

7. The method as claimed in claim 4, wherein the drive signal is produced by adjusting the present torque value to a predeterminable reference torque value and by adjusting the present stator flux value to a predeterminable reference stator flux value.

8. An apparatus for carrying out a method for operating a rotating electrical machine, which machine has at least two sets of stator windings (A, B) and each set of stator windings (A, B) comprises n phase windings, where n≧3, and having in each case one associated converter unit provided for each set of stator windings (A, B) for feed purposes, wherein measuring means are provided for measuring the currents ($i_{A1}, i_{A2}, i_{A3}, i_{B1}, i_{B2}, i_{B3}$) of at least n−1 phase windings of each set of stator windings (A, B), wherein in each case one associated regulating device is provided for each converter unit for the purpose of driving the associated converter unit by means of a drive signal (S) independently of regulating devices of the respective other converter units, and wherein each regulating device is supplied the measured currents ($i_{A1}, i_{A2}, i_{A3}, i_{B1}, i_{B2}, i_{B3}$) of each set of stator windings (A, B) for the purpose of forming the drive signal (S).

9. The apparatus as claimed in claim 8, wherein, in the case of a rotating electrical machine in the form of a synchronous machine, each regulating device has a calculation unit for forming the present torque value ($M_{act}$) and the present stator flux value ($\Phi_{act}$) from the measured currents ($i_{A1}, i_{A2}, i_{A3}, i_{B1}, i_{B2}, i_{B3}$) of each set of stator windings (A, B), from the DC voltage ($U_{DC}$) of a capacitive energy store connected to the respective converter unit and from the rotor position ($\phi$).

10. The apparatus as claimed in claim 9, wherein the calculation unit for forming the present torque value ($M_{act}$) and the present stator flux value ($\Phi_{act}$) is supplied, in addition, the field current ($i_F$).

11. The apparatus as claimed in claim 8, wherein, in the case of a rotating electrical machine in the form of an asynchronous machine, each regulating device has a calculation unit for forming the present torque value ($M_{act}$) and the present stator flux value ($\Phi_{act}$) from the measured currents ($i_{A1}, i_{A2}, i_{A3}, i_{B1}, i_{B2}, i_{B3}$) of each set of stator windings (A, B), from the DC voltage ($U_{DC}$) of a capacitive energy store connected to the respective converter unit and from the rotor speed (V).

12. The apparatus as claimed in claim 9, wherein each regulating device has a regulating unit for adjusting the present torque value ($M_{act}$) to a predeterminable reference torque value ($M_{ref}$) and for adjusting the present stator flux value ($\Phi_{act}$) to a predeterminable reference stator flux value ($\Phi_{ref}$), the device signal (S) being present at the output of the regulating unit.

13. The apparatus as claimed in claim 10, wherein each regulating device has a regulating unit for adjusting the present torque value to a predeterminable reference torque value and for adjusting the present stator flux value to a predeterminable reference stator flux value, the drive signal being present at the output of the regulating unit.

14. The apparatus as claimed in claim 11, wherein each regulating device has a regulating unit for adjusting the present torque value to a predeterminable reference torque value and for adjusting the present stator flux value to a predeterminable reference stator flux value, the drive signal being present at the output of the regulating unit.

* * * * *